United States Patent
Lambert Grossi et al.

(10) Patent No.: US 10,247,435 B2
(45) Date of Patent: Apr. 2, 2019

(54) REAL-TIME CONTROL OF HIGHLY VARIABLE THERMAL LOADS

(71) Applicant: INTERNATIONAL BUSINESS MACHINES CORPORATION, Armonk, NY (US)

(72) Inventors: Charles E. Lambert Grossi, Guadalajara (MX); Karla Magaña Renoud, Zapopan (MX); Ana Maria Najar Petersen, Zapopan (MX); Salvador Antonio Rodriguez Garcia, Santa Anita (MX)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 15/196,511

(22) Filed: Jun. 29, 2016

(65) Prior Publication Data

US 2018/0003402 A1    Jan. 4, 2018

(51) Int. Cl.
*F24F 11/00* (2018.01)
*F24F 11/30* (2018.01)
(Continued)

(52) U.S. Cl.
CPC .............. *F24F 11/30* (2018.01); *F24F 11/62* (2018.01); *F24F 11/63* (2018.01); *G05B 19/042* (2013.01);
(Continued)

(58) Field of Classification Search
CPC ...... F24F 11/006; F24F 11/001; G05B 19/042
See application file for complete search history.

(56) References Cited

U.S. PATENT DOCUMENTS 5,738,441 A    4/1998    Cambridge et al.
7,644,051 B1 *  1/2010    Moore ................ G05B 13/027
                                                        706/16
(Continued)

FOREIGN PATENT DOCUMENTS

JP    2011122802 A    6/2011
JP    2012063037 A    3/2012
(Continued)

OTHER PUBLICATIONS

Mell et al., "The NIST Definition of Cloud Computing", Recommendations of the National Institute of Standards and Technology, National Institute of Standards and Technology, Special Publication 800-145, Sep. 2011, pp. 1-7.

*Primary Examiner* — Vincent H Tran
(74) *Attorney, Agent, or Firm* — Michael A. Petrocelli

(57) ABSTRACT

A method for real-time control of thermal loads in a data center includes storing, in a database, a heat generation data associated with an electronic equipment located in a predetermined area of the data center, transmitting the heat generation data to a data analysis system in communication with a tunable temperature controller, the heat generation data provides a real-time input of an amount of heat generated in the predetermined area, the data analysis system receives and analyzes the heat generation data to determine whether the amount of heat generated in the predetermined area exceeds current settings of the tunable temperature controller, and in response to the amount of heat generated exceeding the current settings of the tunable temperature controller, updating the current settings to provide an amount of cooling that compensates for the amount of heat generated in the predetermined area in association with the electronic equipment.

7 Claims, 6 Drawing Sheets

(51) Int. Cl.
  *G05B 19/042* (2006.01)
  *F24F 11/63* (2018.01)
  *F24F 11/62* (2018.01)
  *F24F 110/00* (2018.01)
  *F24F 140/60* (2018.01)
  *F24F 110/10* (2018.01)
  *F24F 140/50* (2018.01)

(52) U.S. Cl.
  CPC ....... *F24F 2110/00* (2018.01); *F24F 2110/10* (2018.01); *F24F 2140/50* (2018.01); *F24F 2140/60* (2018.01); *G05B 2219/2614* (2013.01)

(56) References Cited

U.S. PATENT DOCUMENTS

| | | | |
|---|---|---|---|
| 8,086,359 B2 | 12/2011 | Spiers et al. | |
| 8,200,995 B2* | 6/2012 | Shiga | G05D 23/1919 713/300 |
| 8,326,466 B2 | 12/2012 | Peterson | |
| 8,694,279 B1* | 4/2014 | Stiver | H05K 7/20836 165/104.33 |
| 8,762,522 B2 | 6/2014 | Moon | |
| 9,147,074 B2 | 9/2015 | Grieco et al. | |
| 9,546,795 B2 | 1/2017 | Pienta et al. | |
| 2004/0173142 A1 | 9/2004 | Willis | |
| 2009/0327778 A1* | 12/2009 | Shiga | G05D 23/1919 713/320 |
| 2013/0345998 A1 | 12/2013 | Matsubara et al. | |
| 2014/0049146 A1* | 2/2014 | Kamaludeen | G06F 1/20 312/236 |
| 2015/0032283 A1* | 1/2015 | Kelkar | H05K 7/20745 700/300 |
| 2015/0057828 A1* | 2/2015 | Civilini | G05B 13/048 700/299 |

FOREIGN PATENT DOCUMENTS

| | | |
|---|---|---|
| JP | 2012080679 A | 4/2012 |
| JP | 2013106367 A | 5/2013 |

* cited by examiner

REAL-TIME CONTROL OF HIGHLY VARIABLE THERMAL LOADS

BACKGROUND

The present invention generally relates to heating, ventilating, and air conditioning (HVAC) systems, and more particularly, to a smart HVAC system capable of performing real-time control of highly variable thermal loads produced by electronic equipment in a data center.

HVAC refers to a technology of indoor environmental comfort. HVAC system design is a major sub-discipline of mechanical engineering, based on the principles of thermodynamics, fluid mechanics, and heat transfer. HVAC is particularly important in the design of data centers where large amounts of information technology (IT) equipment perform work and generate considerable amounts of heat.

A data center is a facility used to house computer systems and associated components, such as telecommunications and storage systems. The physical environment of a data center is rigorously controlled. Air conditioning is used to control the temperature and humidity in the data center. The temperature in a data center naturally rises because the equipment in the data center converts electrical power to heat as a byproduct of performing work. Unless the heat is removed, the ambient temperature increases, resulting in electronic equipment malfunction. By controlling the air temperature, the server components at the board level are kept within the manufacturer's specified temperature/humidity range.

SUMMARY

According to an embodiment of the present disclosure a method for real-time control of thermal loads in a data center may include storing, in a database, heat generation data associated with an electronic equipment connected to an electrical grid, the electronic equipment is located in a predetermined area of the data center; transmitting the heat generation data from the database to a data analysis system in communication with a tunable temperature controller, where the heat generation data provides a real-time input of an amount of heat generated in the predetermined area in association with the electronic equipment; receiving, by the data analysis system, the heat generation data, where the data analysis system analyzes the heat generation data to determine whether the amount of heat generated in the predetermined area in association with the electronic equipment exceeds current settings of the tunable temperature controller; and in response to the amount of heat generated in the predetermined area exceeding the current settings of the tunable temperature controller, updating the current settings of the tunable temperature controller to provide an amount of cooling that compensates for the amount of heat generated in the predetermined area in association with the electronic equipment.

According to another embodiment of the present disclosure, a computer system for real-time control of thermal loads in a data center may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method including storing, in a database, heat generation data associated with an electronic equipment connected to an electrical grid, the electronic equipment is located in a predetermined area of the data center; transmitting the heat generation data from the database to a data analysis system in communication with a tunable temperature controller, where the heat generation data provides a real-time input of an amount of heat generated in the predetermined area in association with the electronic equipment; receiving, by the data analysis system, the heat generation data, where the data analysis system analyzes the heat generation data to determine whether the amount of heat generated in the predetermined area in association with the electronic equipment exceeds current settings of the tunable temperature controller; and in response to the amount of heat generated in the predetermined area exceeding the current settings of the tunable temperature controller, updating the current settings of the tunable temperature controller to provide an amount of cooling that compensates for the amount of heat generated in the predetermined area in association with the electronic equipment.

According to another embodiment of the present disclosure, a computer program product for real-time control of thermal loads in a data center, the computer program product may include a computer readable non-transitory article of manufacture tangibly embodying computer readable instructions which, when executed, cause a computer to carry out a method including storing, in a database, heat generation data associated with an electronic equipment connected to an electrical grid, the electronic equipment is located in a predetermined area of the data center; transmitting the heat generation data from the database to a data analysis system in communication with a tunable temperature controller, where the heat generation data provides a real-time input of an amount of heat generated in the predetermined area in association with the electronic equipment; receiving, by the data analysis system, the heat generation data, where the data analysis system analyzes the heat generation data to determine whether the amount of heat generated in the predetermined area in association with the electronic equipment exceeds current settings of the tunable temperature controller; and in response to the amount of heat generated in the predetermined area exceeding the current settings of the tunable temperature controller, updating the current settings of the tunable temperature controller to provide an amount of cooling that compensates for the amount of heat generated in the predetermined area in association with the electronic equipment.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
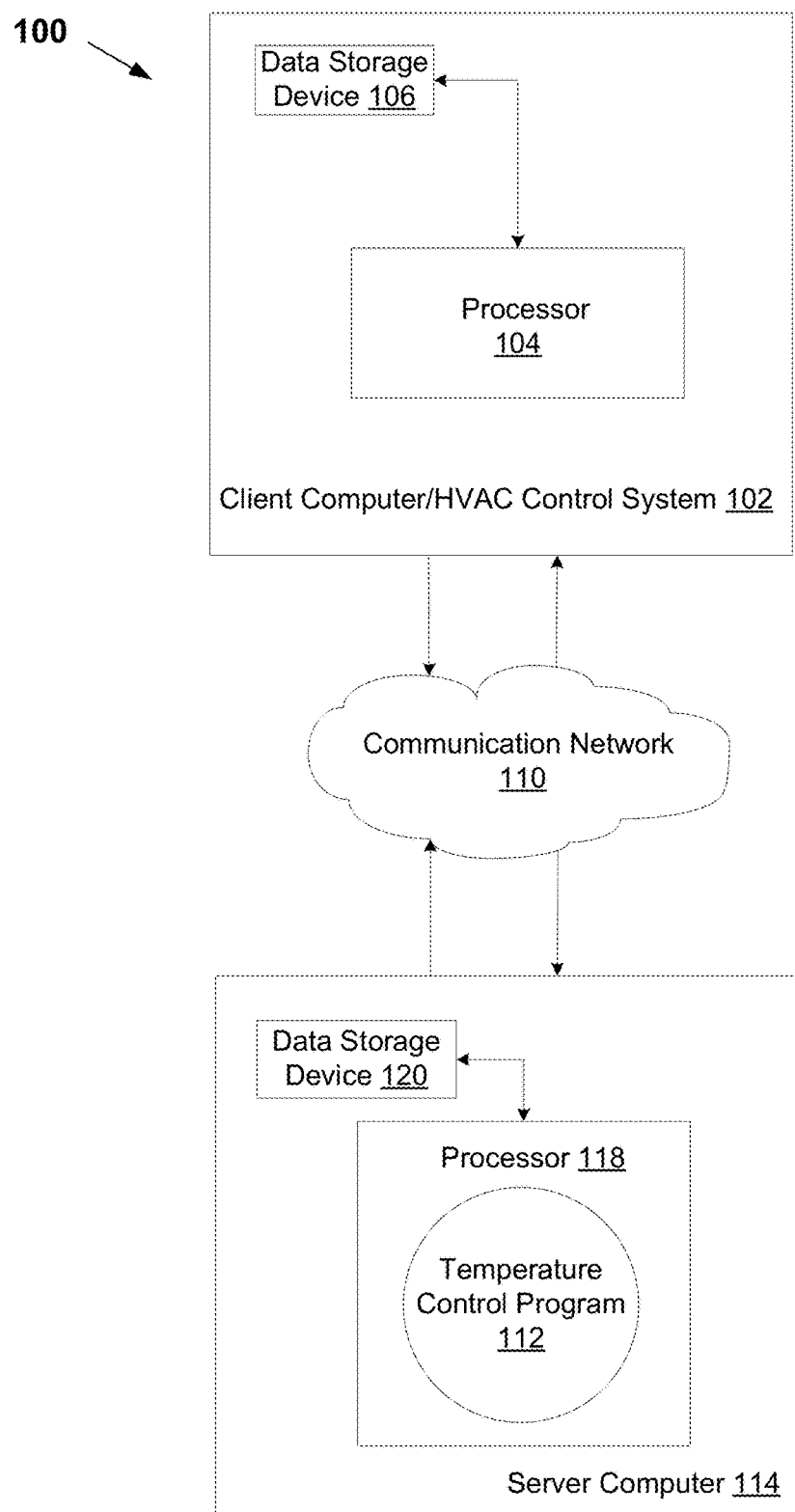
FIG. 1 is a block diagram illustrating a networked computer environment, according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

As discussed above, the ambient temperature in a data center may naturally rise due to the conversion of electrical power to heat as a byproduct of the work performed by the electronic equipment in the data center. Heating, ventilation, and/or air conditioning (HVAC) systems are typically used to control the air temperature within the data center to keep or maintain temperature/humidity within a specified range for optimal operation of computer equipment.

Considerable amounts of energy are generally wasted in large buildings (e.g. server manufacturing facilities, data centers etc.) to keep fluctuations in air temperature under control. These fluctuations are commonly a consequence of highly variable thermal loads produced by the electronic equipment housed in such buildings. Typically, the electronic equipment reaches a peak temperature before the HVAC system reacts to such temperature variations.

Although many predictive HVAC control systems are currently available, they generally focus on wide analytics or overall energy consumption to determine or predict thermal loads. For instance, at present, HVAC systems may acquire thermal load data directly from an average temperature sensed by one or more thermostats usually located in key areas within the data center. Other approaches to determine temperature fluctuations in the electronic equipment may include calculating the thermal load based on time zones (sunlight), predictive heat sensing, radiation temperature sensing, and/or heat load prediction. None of these methods allow the HVAC system to perform a real-time calculation of the heat or thermal load generated by the electronic equipment in a specific area and immediately implement corrective measures.

The proposed method and associated system may improve the capabilities of current HVAC systems by allowing for the calculation or prediction of future energy (BTU) requirements to be met by the HVAC system based on a heat generation database by which identification of real-time thermal loads generated by one or more electronic devices currently connected to an electrical grid is performed. More specifically, the proposed method and associated system may combine inputs from a heat data source identifying electronic devices connected to an electrical grid (such as a manufacturing shop floor control system or similar) and real-time power load information of the electronic devices, apply analytics to this data, convert the electrical requirement information to a corresponding heat requirement, communicate an action to the HVAC system to be performed in response to the calculated heat requirement and perform a preventive adjustment to the HVAC system settings to match future temperature requirements. As such, sudden temperature increases may be predicted and prevented in the electronic equipment.

By performing real-time determination of thermal loads generated by the electronic equipment, embodiments of the present disclosure, may, among other potential benefits, adjust and keep the electronic equipment at a safe temperature range to avoid equipment malfunctioning and possible damage. In addition, the proposed method and associated system may also determine a decrease in heat generation and adjust the HVAC settings (e.g. lower default value settings) accordingly in order to save energy.

Embodiments of the present invention generally relate to heating, ventilating, and air conditioning (HVAC) systems, and more particularly, to a smart HVAC system capable of performing real-time control of highly variable thermal loads produced by electronic equipment in a data center.

Referring now to FIG. 1, an exemplary networked computer environment 100 is depicted, according to an embodiment of the present disclosure. The networked computer environment 100 may include a client computer or HVAC control system 102 and a server computer 114. The HVAC control system 102 may communicate with the server computer 114 via a communications network 110 (hereinafter "network"). The client computer 102 may include a data storage device 106 and a processor, and is enabled to interface with a user and communicate with the server computer 114. The server computer 114 may also include a data storage device 120 and a processor 118 that is enabled to run a temperature control program 112. In an embodiment, the client computer 102 may operate as an input device including a user interface while the temperature control program 112 may run primarily on the server computer 114. In an alternative embodiment, the temperature control program 112 may run primarily on the client computer 102 while the server computer 114 may be used for processing a storage of data used by the temperature control program 112.

It should be noted, however, that processing for the temperature control program 112 may, in some instances be shared amongst the client computer 102 and the server computer 114 in any ratio. In another embodiment, the temperature control program 112 may operate on more than one server computer 114, client computer 102, or some combination of server computers 114 and client computers 102, for example, a plurality of client computers 102 communicating across the network 110 with a single server computer 114.

The network 110 may include connections, such as wire, wireless communication links, fiber optic cables, or some combination thereof. In general, the network 110 can be any combination of connections and protocols that will support communications between the client computer 102 and the server computer 114. The network 110 may include various types of networks, such as, for example, a local area network (LAN), a wide area network (WAN) such as the Internet, a telecommunication network, a wireless network, a public switched network and/or a satellite network.

In various embodiments, the client computer 102 and/or the server computer 114 may be, for example, a laptop computer, tablet computer, netbook computer, personal computer (PC), a desktop computer, a personal digital assistant (PDA), a smart phone, a mobile device, or any programmable electronic device capable of communicating with the server computer 114 via the network 110.

The networked computer environment 100 may include a plurality of client computers 102 and server computers 114, only one of which is shown. It should be appreciated that FIG. 1 provides only an illustration of one implementation and does not imply any limitations with regard to the environments in which different embodiments may be implemented. Many modifications to the depicted environments may be made based on design and implementation requirements.

As will be discussed with reference to FIG. 4, server computer 114 may include internal components 402a and external components 404a, respectively, and client computer/HVAC control system 102 may include internal components 402b and external components 404b, respectively. Client computer/HVAC control system 102 may be, for example, a mobile device, a telephone (including smartphones), a personal digital assistant, a netbook, a laptop computer, a tablet computer, a desktop computer, or any type of computing devices capable of accessing a network.

The temperature control program 112 and associated methods are described and explained in further detail below with reference to FIGS. 2 and 3.

Figure 2:
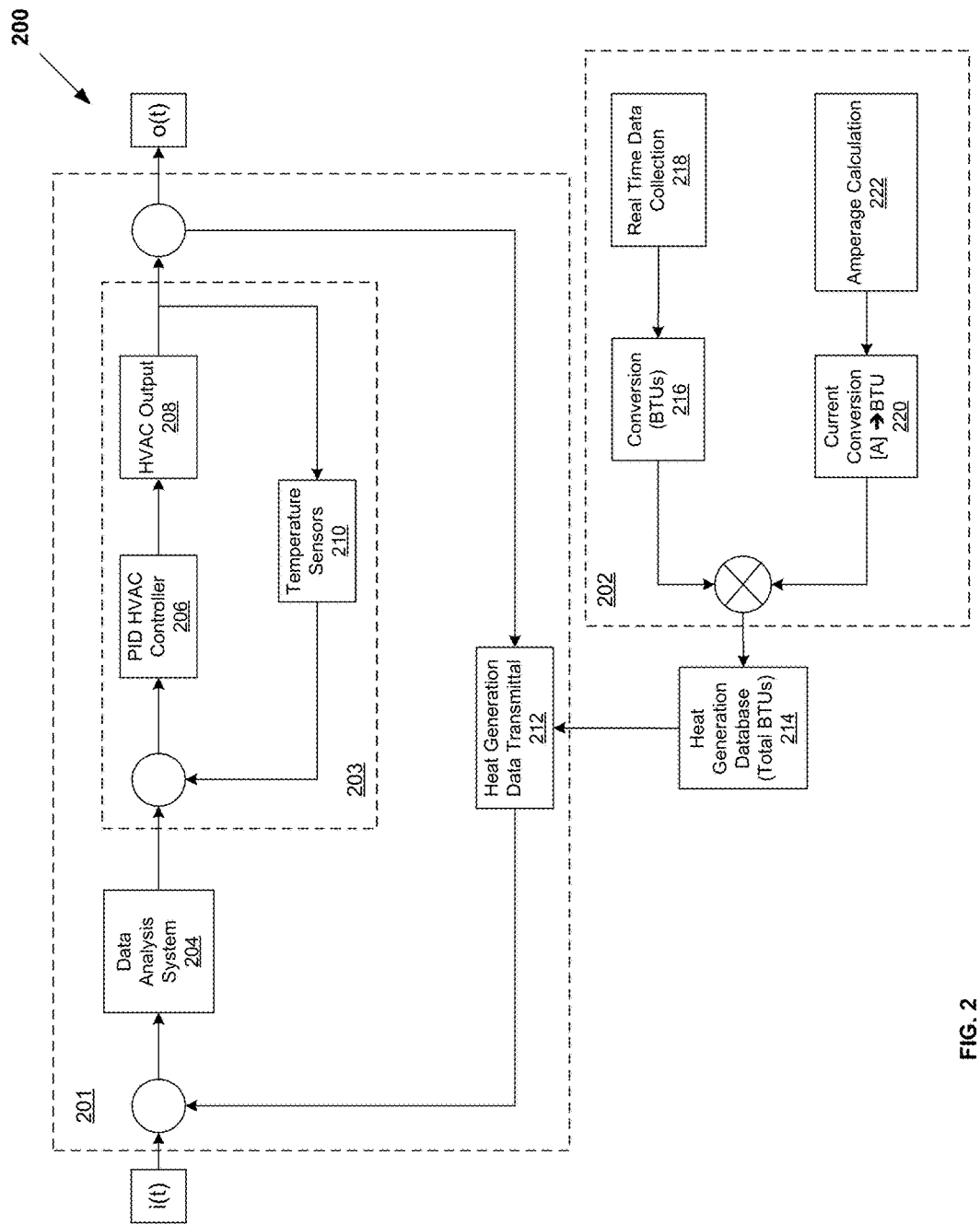
FIG. 2 is a block diagram illustrating a HVAC control system for real-time control of highly variable thermal loads, according to an embodiment of the present disclosure.

Referring now to FIG. 2, a block diagram 200 illustrating the components of an improved HVAC system capable of performing real-time control of highly variable thermal loads produced by electronic equipment in, for example, a data center is shown, according to an embodiment of the present disclosure. The block diagram 200 may include a control loop 201 and a data acquisition loop 202. Electric power consumption data may be collected, in real-time, by the data acquisition loop 202 and transmitted to a heat generation database 214 from which the collected data is sent to the control loop 201.

More specifically, a real-time data collection module 218 collects, in real-time, electric power consumption (hereinafter "power consumption") of one or more electronic devices connected to an electrical grid in a predetermined area of the data center. In embodiments in which the one or more electronic devices are part of a floor control system, the collected power consumption data may include machine type and model (MTM) of the one or more electronic devices. The real-time data collection module 218 sends the collected power consumption data per area to a conversion module 216. In the conversion module 216, the collected power consumption data, which is generally expressed in Watts [W], is converted to heat generation per unit area using any method known in the art, which may include, for example, unit conversion tables.

It should be noted that the traditional measuring unit to express heat generation is the British thermal unit [BTU], as such, the conversion module 216, may convert the collected electric power consumption data in Watts to heat generation data expressed in BTUs. Converting power units other than Watts to thermal units other than BTUs, and vice versa, are also explicitly contemplated in the present embodiment.

It should also be noted that although the present embodiment focuses on thermal loads generated by electronic equipment in a data center, other type of production/manufacturing facilities may be contemplated, including, for example, server manufacturing facilities.

Simultaneously, a plurality of sensors in an amperage calculation module 222 may measure the total amperage drawn by the electronic device/equipment in the predetermined area (e.g., amperage drawn from a socket). Subsequently, in a current conversion module 220, the measured amperage is converted to BTUs per unit area and combined with the heat generation data determined above. Total heat generation data combined from both of the conversion modules 216, 220 of the data acquisition loop 202 is stored in the heat generation database 214.

More specifically, in this embodiment, the total heat generation data stored in the heat generation database combines real-time heat generation information obtained from at least two sources (power consumption and total amperage drawn) per electronic equipment in the predetermined area. As such, the data acquisition loop 202 may constantly provide or feed the heat generation database with up-to-date heat generation data from the electronic equipment in the determined area. It should be noted that, in this embodiment, any other method known in the art may be used for determining the total heat generation from the electronic equipment, and additional heat generation sources may also be considered.

Consequently, the total heat generation data is sent from the heat generation database 214 to a heat generation data transmittal module 212 in the control loop 201. The heat generation data transmittal module 212 sends the total heat generation data to a data analysis system 204, in which the received heat generation information is analyzed.

In an embodiment, the data analysis system 204 may include, for example, a fuzzy logic system capable of analyzing a large set of analog thermal data points and enabling settings in an HVAC controller (e.g. PID HVAC controller 206).

In another embodiment, the data analysis system 204 may include a data mining system capable of determining thermal patterns per area in the data center and act accordingly. More specifically, the data mining system may include a plurality of data mining techniques capable of determining patterns in a large set of thermal data points.

In yet another embodiment, the data analysis system 204 may include predictive analytics tools based on IBM's Watson technology platform such that the data analysis system 204 is capable of analyzing large sets of structured, semi-structured and unstructured data from the heat generation data transmittal module 212 and also capable of: 1) determining thermal patterns across space in real-time; 2) predicting thermal load patterns based on historical data; and 3) optimizing HVAC parameters based on the behavior of thermal loads and according to user requirements.

The data analysis system 204 may, based on results of the analysis performed on the received total heat generation data, send a signal to a sub-loop 203 containing an action to be taken in the sub-loop 203. It should be noted that the sub-loop 203 represents a typical HVAC system, which may generally include a proportional-integral-derivative (PID) controller (PID HVAC controller 206), an output module (HVAC output 208) and temperature sensors 210.

In the PID HVAC controller 206 a plurality of parameters (hereinafter "parameters") are generally defined either manually or automatically, such as, for example, a threshold temperature for a particular area or a particular electronic equipment, above which the HVAC system may be turned on. Manual or automatic specification of these parameters defines "current settings" of the PID HVAC controller 206.

More specifically, the PID HVAC controller 206 may be automatically updated or have a set of parameters which may be manually adjusted. Such parameters generally include, one or all of the following: a proportional, integrative and derivative (PID) setting which allow the controller (e.g., PID HVAC controller 206) to maximize a transfer HVAC function such that a given setpoint (e.g., a desired or target temperature) may be reached while minimizing oscillations and overshoot of such function. As may be known by those skilled in the art, the transfer HVAC function provides a dynamic means of accounting for heat transfer and the specific system behavior to control the air temperature in thermostat zones.

As such, if the data analysis system 204 determines that the total heat generated in a particular predetermined area by the electronic equipment in that area exceeds or is greater than the current settings of the PID HVAC controller 206, the HVAC system depicted by sub-loop 203 may receive an additional input from the data analysis system 204 in order to adjust the HVAC system output 208. It may be understood that, in some embodiments, the sub-loop 203 may be continuously running and that the data analysis system 204 adjust the input to the sub-loop 203, in response to a detected temperature increase, such that a generated output in the HVAC system output 208 reflects a decision made by the data analysis system 204.

Therefore, since heat generation data may be determined per area and/or per electronic equipment using the method described above, targeted cooling may be performed according to the determined heat generation data by area and/or electronic equipment. By performing localized cooling by area and/or electronic equipment within the data center, energy waste may decrease and, in consequence, costs associated with energy consumption may be reduced.

In some embodiments, results of the analysis performed on the received heat generation data by the data analysis system 204 may also be used to predict future temperature fluctuations and adjust parameters of the PID HVAC controller 206 accordingly in order to take the appropriate corrective measure even before temperature fluctuations occur. Data points generated through time (historic data) by the data acquisition loop 202 and stored in the heat generation data base 214 may be used to extract patterns in the behavior of thermal loads.

Furthermore, labeling of data points based on a setpoint threshold may enable continuous generation of training data for a machine learning engine. Thus, incremental optimization and prediction capabilities may be expected in the proposed method and associated system. As such temperature fluctuations may be predicted and prevented by adjusting settings of the PID HVAC controller 206 according to the extracted patterns.

If the data analysis system 204 determines that the total heat generated (e.g., from the total heat generation data) is below or less than the current settings of the PID HVAC controller 206, the HVAC system depicted by sub-loop 203 is kept under current working conditions.

Figure 3:
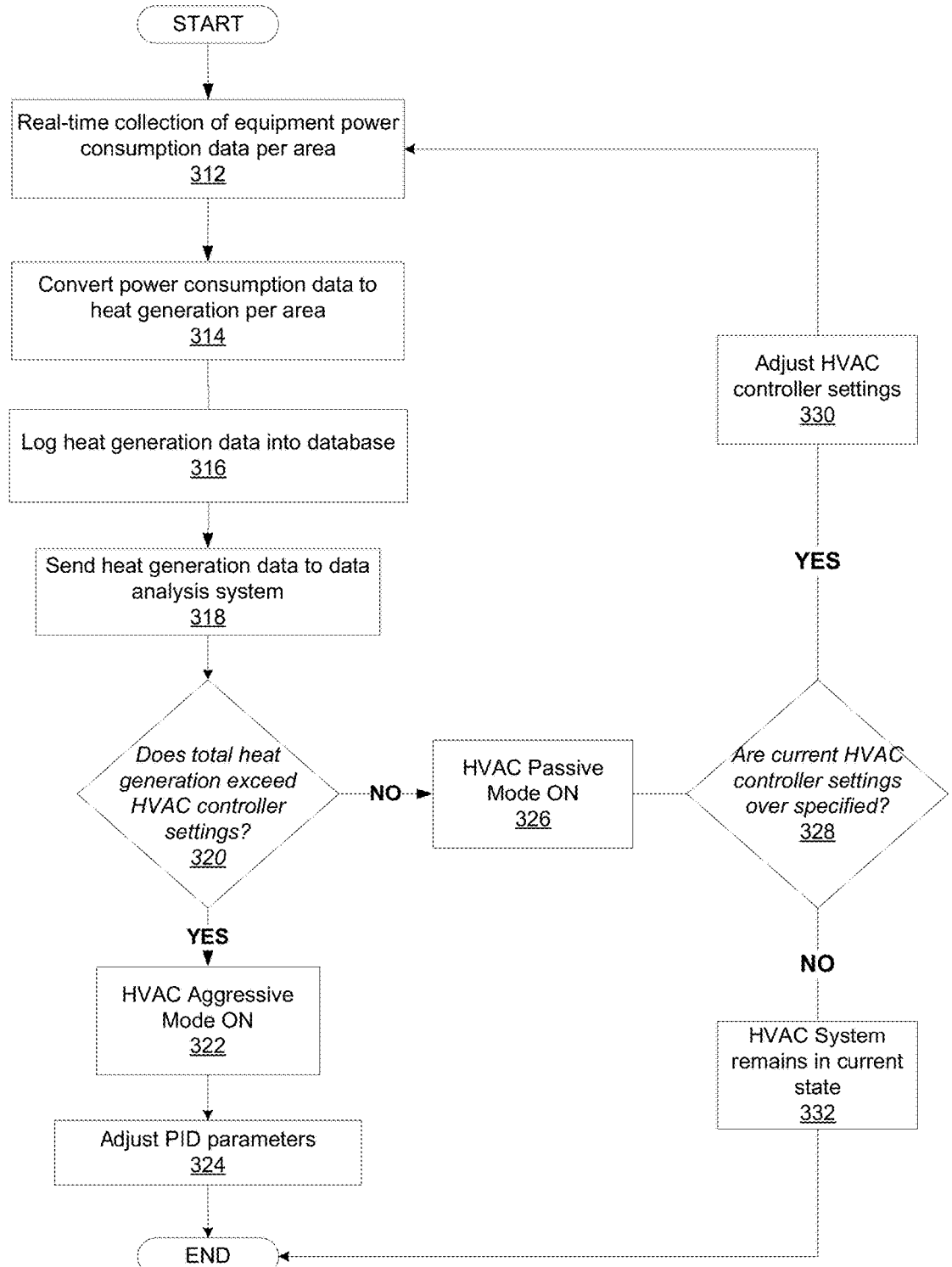
FIG. 3 is flowchart depicting the steps of a method for real-time control of highly variable thermal loads using the proposed HVAC control system, according to an embodiment of the present disclosure.

Referring now to FIG. 3, a flowchart depicting the operational steps of the temperature control program 112 of FIG. 1, is shown in accordance with an embodiment of the present invention.

In this embodiment, real-time collection of power consumption data takes place at 312. It should be noted that, at this step, the power consumption data may be collected such that total power consumption for a predetermined area and/or a particular electronic equipment may be obtained and recorded. More specifically, real-time collection of power consumption data from one or more electronic devices connected to an electrical grid is determined per area and/or electronic equipment by, for example, modules 218, 222 in FIG. 2. The collected power consumption data (312), generally expressed in Watts [W] and/or Ampere [A], is converted, at 314, to total heat generation in BTU per unit area (e.g. modules 216, 220 in FIG. 2). This total heat generation data, which in this embodiment is expressed in BTUs, combines real-time heat generation information from different sources such as total power consumption and total amperage drawn per electronic equipment in the predetermined area of the data center.

At 316, the total heat generation data from 314 is then logged or stored into a database (e.g. heat generation database 214 in FIG. 2). From the database (316), the total heat generation data is sent, at 318, to a data analysis system (e.g. data analysis system 204 in FIG. 2) which may include, for example, a fuzzy logic system or predictive analytics based on IBM's Watson technology. In the data analysis system, the transferred heat generation data is analyzed and results of the analysis are evaluated at 320. When total heat generation exceeds or is greater than a setpoint in the current settings of a PID controller of the HVAC system (e.g. the PID HVAC controller 206 in FIG. 2), the HVAC system is turned on and/or adjusted to meet demand. This may be done per device, but more practically, for a number of electronic devices in a predetermined area.

It should be noted that, in some instances, the HVAC system may be turned on using an aggressive mode. The aggressive mode may include a substantially fast response from the HVAC system based on the results of analyzing the heat generation data (320) and the corresponding tuning of the PID controller parameters. More specifically, the proposed method may allow the HVAC system to reach a desired setpoint faster, however, in some cases, an overshoot, followed by decremental oscillations in the thermal transfer function may be observed.

In such cases, the real-time data analysis may enable a continuous tuning of PID parameters in order to mitigate the overshoot and oscillations in the thermal transfer function which is referred to as the aggressive mode. Furthermore, as patterns are recognized by the real-time data analysis system (e.g. Data Analysis System 204 in FIG. 2) in the collected total heat generation data, the level of aggressive increments in all three parameters (Proportional, Integrative, and Derivative) of the HVAC controller may be optimized in order to minimize or eliminate both the overshoot and oscillations in the thermal transfer function.

At 324, results from the analysis of the heat generation data at 318 are used to adjust parameters of the PID controller (e.g. the PID HVAC controller 206 in FIG. 2) such that prediction of future temperature fluctuations can be performed and make appropriate adjustments to the PID controller of the HVAC system even before the temperature fluctuations occur. When implemented, the data analytics engine may discover patterns of thermal loads through time based on the total heat generation data. Such thermal load patterns may include, hockey stick style behavior, incremental growth as indicated/transmitted by the data center owner, or any other pattern deterministic of the thermal loads generated through time. Furthermore, in some embodiments, statistical analysis of the obtained thermal load patterns may be conducted in order to determine whether the system should act upon such predictions.

When the calculated total heat generation is below the setpoint in the current settings of the PID controller of the HVAC system at 320, the HVAC system is turned off or remains on a passive mode. The system passive mode represents a relatively low functional emergence of the HVAC system based on the tuning of the PID parameters. Enabling the HVAC system to remain at a desired setpoint or passive mode until changes in thermal loads are detected may help reducing energy consumption associated with unnecessary cooling cycles.

At 328, using the results from the data analysis system (318), the current settings of the PID controller are studied or analyzed in order to determine if they are accurately set. If, at 328, it is determined that the settings of the HVAC system PID controller are over specified (e.g., a temperature threshold set to a value that is substantially larger than the actual temperature value), the settings are adjusted or changed at 330, and the process returns to 312. Otherwise, the PID controller settings and HVAC system remain in their current state (332) and the process ends.

Therefore, by combining a traditional HVAC system with a real-time data acquisition loop and a control loop including advanced data analytics, embodiments of the present disclosure may, among other potential benefits, perform real-time determination of thermal loads generated by electronic equipment per area and/or electronic equipment, keep the electronic equipment at a safe temperature range to avoid equipment malfunctioning and possible damage, determine present and future increase/decrease in heat generation and adjust HVAC settings accordingly in order to reduce energy consumption and associated costs.

Embodiments of the present disclosure may provide a heating, venting, and air conditioning (HVAC) system including a set of thermostats, a set of cooling units, a set of heating units and a tunable temperature controller; a database, in communication with tunable temperature controller, receiving real time input of BTU's generated in a particular area in association with one or more specific devices in the particular area, where the BTUs can be received as at least one of data sensed, data derived from other sensors or data obtained from a system that provides BTUs containing information that includes a machine type, model and wattage; an analyzer configured to analyze variables including hardware, electricity, power consumption to determine a location of heating sources and an amount of heat produced over a specific period of time; a comparator to determine in real time whether the BTUs generated exceed current HVAC settings, wherein in response to a determination the BTUs generated exceed the current HVAC settings, the tunable temperature controller adjusts an amount of cooling necessary to compensate for additional BTUs produced, and in response to a determination the BTUs generated are less than the current HVAC settings, the tunable temperature controller adjusts an amount of cooling necessary to compensate for reduced BTUs produced; and an air handling system controlling delivery of heating and cooling produced by the HVAC system, into the particular area on demand in real time.

Figure 4:
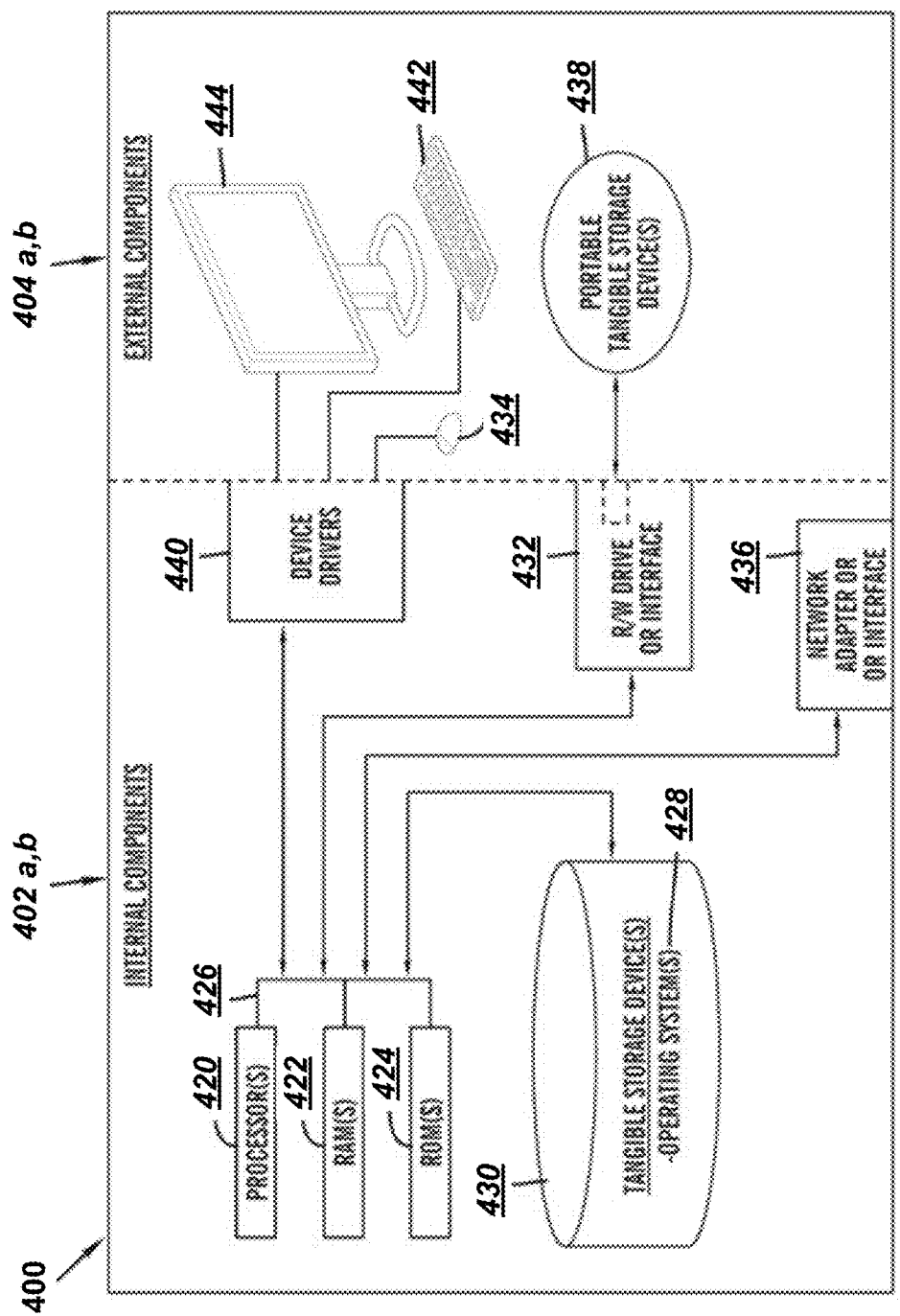
FIG. 4 is a block diagram of internal and external components of computers and servers depicted in FIG. 1, according to an embodiment of the present disclosure.

Referring now to FIG. 4, a block diagram 400 of internal and external components of computers depicted in FIG. 1 is shown according to an embodiment of the present disclosure. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 402, 404 is representative of any electronic device capable of executing machine-readable program instructions. Data processing system 402, 404 may be representative of a smart phone, a computer system, PDA, or other electronic devices. Examples of computing systems, environments, and/or configurations that may be represented by data processing system 402, 404 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computer/HVAC Control System 102 (FIG. 1) and server computer 114 (FIG. 1) may include respective sets of internal components 402 *a,b* and external components 404 *a,b* illustrated in FIG. 4. Each of the sets of internal components 402 include one or more processors 420, one or more computer-readable RAMs 422 and one or more computer-readable ROMs 424 on one or more buses 426, and one or more operating systems 428 and one or more computer-readable tangible storage devices 430. Software programs in the client computer/HVAC Control System 102 (FIG. 1) and the server computer 114 (FIG. 1) are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 *a,b* also includes a R/W drive or interface 432 to read from and write to one or more portable computer-readable tangible storage devices 438 such as a CD-ROM, DVD, memory stick, magnetic tape, magnetic disk, optical disk or semiconductor storage device. Software programs, such as the first and second plurality of modules described above can be stored on one or more of the respective portable computer-readable tangible storage devices 438, read via the respective R/W drive or interface 432 and loaded into the respective hard drive 430.

Each set of internal components 402 *a,b* also includes network adapters or interfaces 436 such as a TCP/IP adapter cards, wireless Wi-Fi interface cards, or 3G or 4G wireless interface cards or other wired or wireless communication links. Software programs in client computer/HVAC Control System 102 (FIG. 1) and server computer 114 (FIG. 1) can be downloaded to the client computer/HVAC Control System 102 (FIG. 1) and server computer 114 (FIG. 1) from an external computer via a network (for example, the Internet, a local area network or other, wide area network) and respective network adapters or interfaces 436. From the network adapters or interfaces 436, the temperature control program 112 in the server computer 114 (FIG. 1) is loaded into the respective hard drive 430. The network may comprise copper wires, optical fibers, wireless transmission, routers, firewalls, switches, gateway computers and/or edge servers.

Each of the sets of external components 404 *a,b* can include a computer display monitor 444, a keyboard 442, and a computer mouse 434. External components 404 *a,b* can also include touch screens, virtual keyboards, touch pads, pointing devices, and other human interface devices. Each of the sets of internal components 402 *a,b* also includes device drivers 440 to interface to computer display monitor 444, keyboard 442 and computer mouse 434. The device drivers 440, R/W drive or interface 432 and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
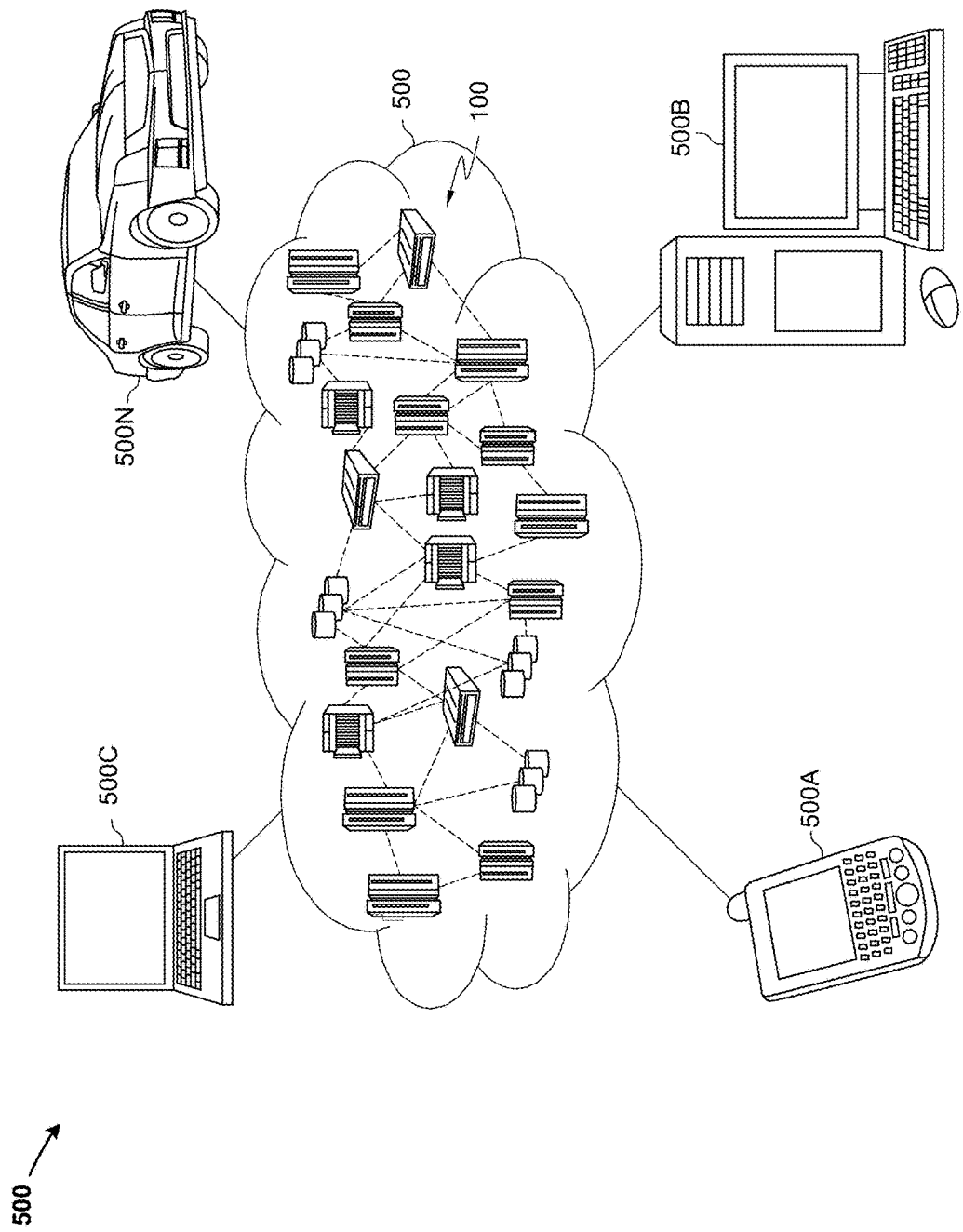
FIG. 5 is a block diagram of an illustrative cloud computing environment including the computer system depicted in FIG. 1, according to an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
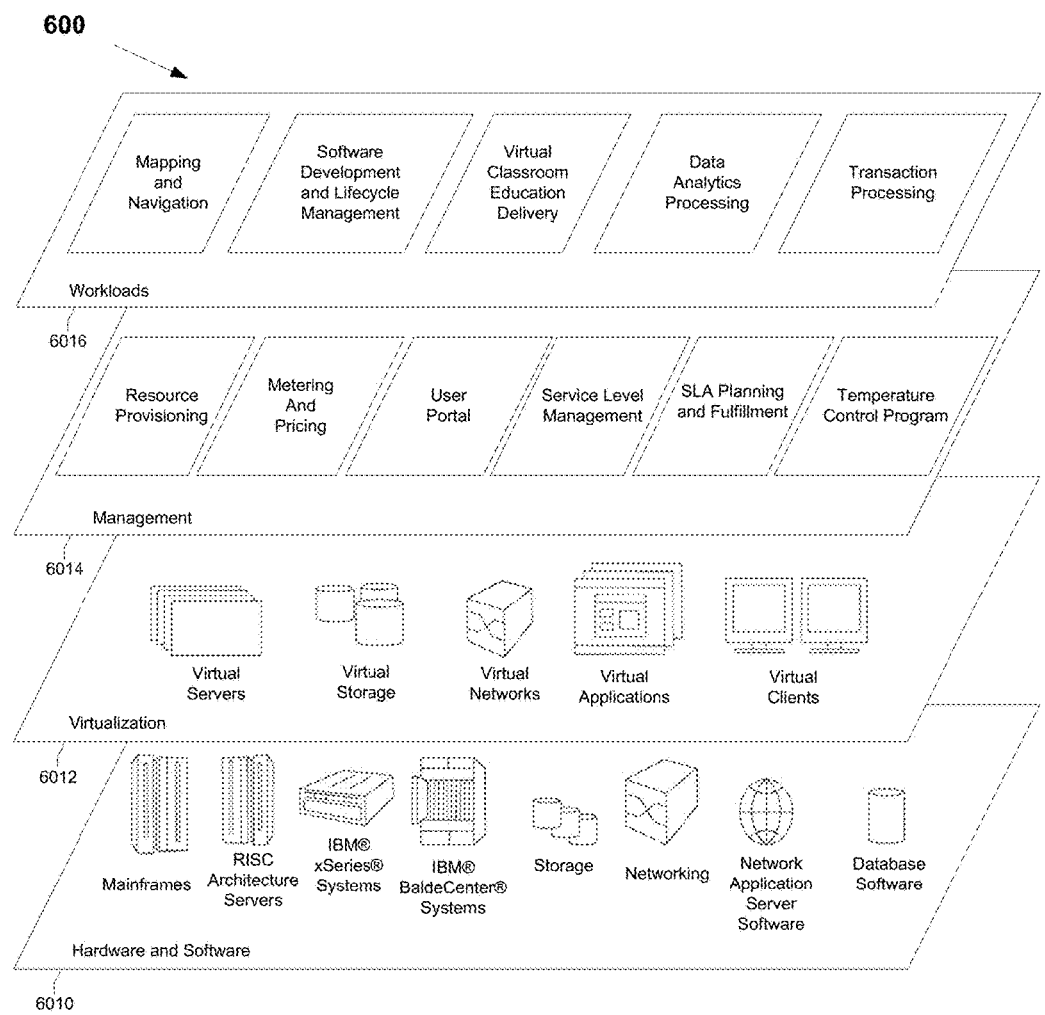
FIG. 6 is a block diagram of functional layers of the illustrative cloud computing environment of FIG. 5, according to an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 6010 includes hardware and software components. Examples of hardware components include: mainframes; RISC (Reduced Instruction Set Computer) architecture based servers; storage devices; networks and networking components. In some embodiments, software components include network application server software.

Virtualization layer 6012 provides an abstraction layer from which the following examples of virtual entities may be provided: virtual servers; virtual storage; virtual networks, including virtual private networks; virtual applications and operating systems; and virtual clients.

In one example, management layer 6014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A temperature control program for real-time control of highly variable thermal loads produced by electronic equipment in a data center.

Workloads layer 6016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for real-time control of thermal loads in a data center, the method comprising:
    collecting, in real-time, power consumption data associated with an electronic equipment connected to an electrical grid and located in a predetermined area of the data center, wherein the power consumption data comprises machine type and model of the electronic equipment;
    collecting, in real-time and from a plurality of sensors, a total amperage drawn by the electronic equipment;
    converting the power consumption data and the total amperage drawn to heat measuring units;
    combining the power consumption data and the total amperage drawn in heat measuring units to obtain heat generation data for the predetermined area in association with the electronic equipment;
    storing, in a database, the heat generation data associated with the electronic equipment;
    transmitting the heat generation data from the database to a data analysis system in communication with a tunable temperature controller, wherein the heat generation data provides a real-time input of an amount of heat generated in the predetermined area in association with the electronic equipment;
    receiving, by the data analysis system, the heat generation data, wherein the data analysis system analyzes the heat generation data to determine whether the amount of heat generated in the predetermined area in association with the electronic equipment exceeds current settings of the tunable temperature controller; and
    in response to the amount of heat generated in the predetermined area exceeding the current settings of the tunable temperature controller, updating the current settings of the tunable temperature controller to provide an amount of cooling that compensates for the amount of heat generated in the predetermined area in association with the electronic equipment.

2. The method of claim 1, further comprising:
    in response to the amount of heat generated in the predetermined area being below the current settings of the tunable temperature controller, maintaining the current settings of the tunable temperature controller.

3. The method of claim 1, wherein the data analysis system analyzing the heat generation data comprises:
    using a fuzzy logic system capable of analyzing a large set of analog thermal data points in the heat generation data.

4. The method of claim 1, wherein the data analysis system analyzing the heat generation data comprises:
    using a plurality of data mining techniques to determine patterns in a large set of data points in the heat generation data.

5. The method of claim 1, wherein the data analysis system analyzing the heat generation data comprises:
    using predictive analytics tools based on IBM's Watson technology such that the data analysis system is capable of analyzing large sets of structured, semi-structured, and unstructured heat generation data,
    wherein by using the predictive tools based on IBM's Watson technology, the data analysis system is also capable of determining thermal patterns across space in real-time, predicting thermal load patterns based on historical data, and optimizing current settings of the tunable temperature controller based on the thermal patterns and according to user requirements.

6. The method of claim 1, further comprising:
    identifying, by the data analysis system, a pattern in a behavior of the amount of heat generated through time in the predetermined area based on the transmitted heat generation data;
    adjusting the current settings of the tunable temperature controller based on the identified pattern such that a future increase in the amount of heat generated in the predetermined area in association with the electronic equipment is predicted; and
    in response to the future increase in the amount of heat generated in the predetermined area being predicted, providing a corresponding amount of cooling to the predetermined area to prevent a temperature increase in the electronic equipment.

7. The method of claim 1, wherein the tunable temperature controller comprises a proportional-integral-derivative (PID) controller of a heat, venting, and air conditioning (HVAC) system.

* * * * *